United States Patent
Repetto et al.

(10) Patent No.: US 7,333,073 B2
(45) Date of Patent: Feb. 19, 2008

(54) SYSTEM FOR THE REMOTE ASSISTANCE OF AN OPERATOR DURING A WORK STAGE

(75) Inventors: Piermario Repetto, Orbassano (IT); Stefano Bernard, Orbassano (IT); Luca Liotti, Orbassano (IT); Nereo Pallaro, Orbassano (IT); Roberto Finizio, Orbassano (IT); Cosimo Carvignese, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 576 days.

(21) Appl. No.: 11/022,657

(22) Filed: Dec. 28, 2004

(65) Prior Publication Data
US 2005/0156816 A1  Jul. 21, 2005

(30) Foreign Application Priority Data
Dec. 30, 2003  (IT)  ............ TO2003A1055

(51) Int. Cl.
G09G 5/00  (2006.01)

(52) U.S. Cl. .............. 345/8; 345/7; 345/9; 359/630

(58) Field of Classification Search .......... 345/1.1–1.3, 345/7–9; 348/53; 349/11; 351/157; 359/11, 359/14, 630–633
See application file for complete search history.

(56) References Cited

U.S. PATENT DOCUMENTS

| | | | |
|---|---|---|---|
| 4,028,725 A | 6/1977 | Lewis | |
| 4,915,487 A | 4/1990 | Riddell, III et al. | |
| 5,585,813 A | 12/1996 | Howard | |
| 5,701,131 A | 12/1997 | Kuga | |
| 6,091,546 A * | 7/2000 | Spitzer | 359/618 |
| 6,356,437 B1 * | 3/2002 | Mitchell et al. | 361/683 |
| 6,456,261 B1 * | 9/2002 | Zhang | 345/8 |
| 7,126,558 B1 * | 10/2006 | Dempski | 345/8 |
| 7,248,232 B1 * | 7/2007 | Yamazaki et al. | 345/8 |

FOREIGN PATENT DOCUMENTS

| | | |
|---|---|---|
| EP | 0 714 043 A1 | 5/1996 |
| EP | 0714043 A1 | 5/1996 |
| FR | 2 612 351 | 3/1987 |
| FR | 2612351 | 3/1987 |
| GB | 2 275 412 A | 8/1994 |
| GB | 2275412 A | 8/1994 |

* cited by examiner

*Primary Examiner*—Richard Hjerpe
*Assistant Examiner*—Mansour M. Said
(74) *Attorney, Agent, or Firm*—Sughrue Mion, PLLC

(57) ABSTRACT

Interface system for assisting an operator during a work stage comprising a support structure wearable by the operator, with a transparent screen placed in front of the operator's eyes to permit him to see a portion of a background; a virtual image generator for producing an optical signal directed towards the operator's retina so as to form a virtual image at a predetermined distance from the operator's eyes and superimposed on the background; a recording device integral with the operator's head, to record part of the operator's visual field and make available a signal representative of the visual field; a processing device for processing the signal from the recording device and generating a visual information signal of use to the operator for carrying out the work stage; and a device of reception/transmission for sending the signal from the recording device to the processing device, and rendering the information signal to the virtual image generator.

19 Claims, 4 Drawing Sheets

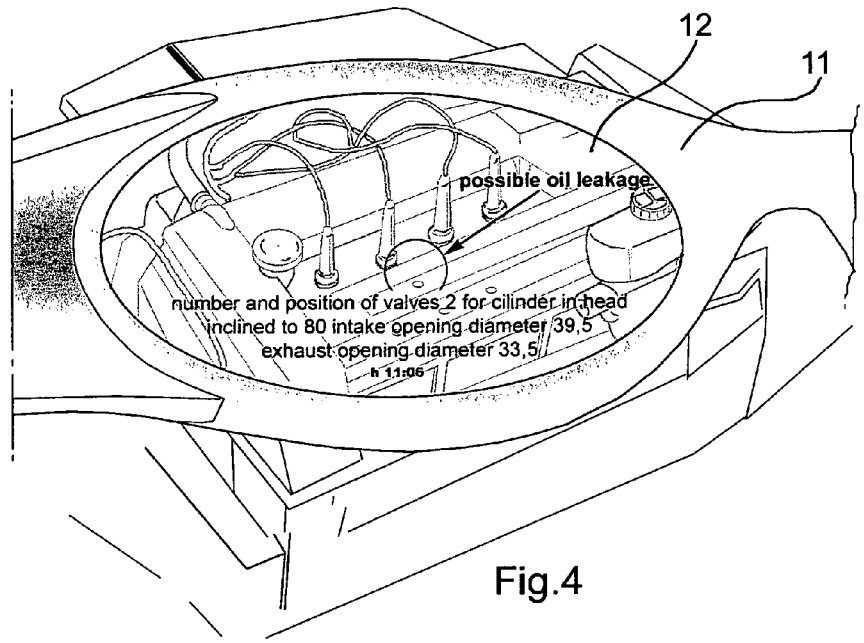
Fig.4
Fig.5
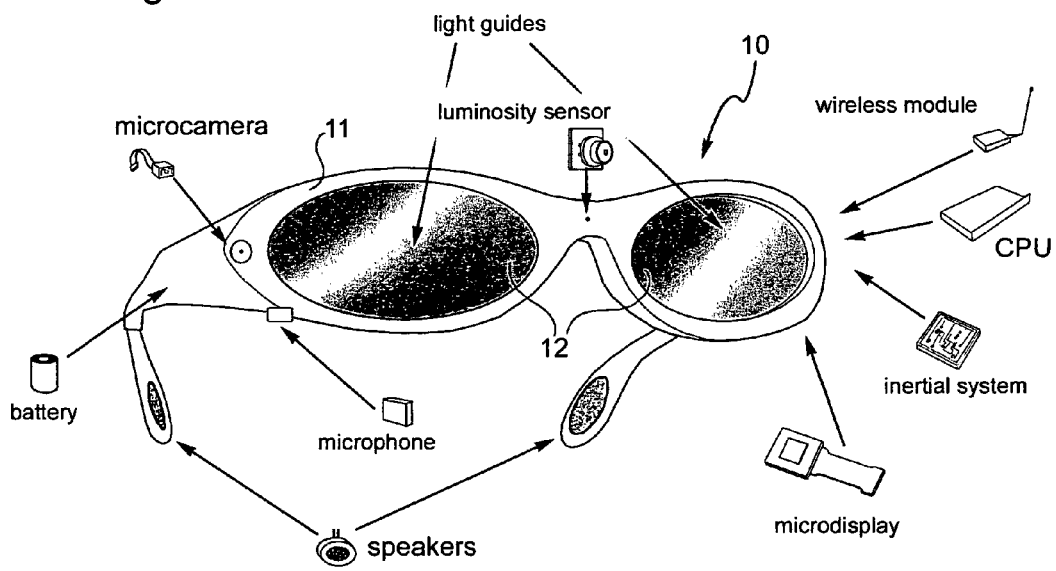

SYSTEM FOR THE REMOTE ASSISTANCE OF AN OPERATOR DURING A WORK STAGE

BACKGROUND OF THE INVENTION

This invention refers to systems for the remote assistance of operators, of the type capable of providing an operator, engaged in complex assembly, inspection, repair and similar operations, with information in real time relating to the operating conditions and instructions regarding the movements and actions to take.

The work of qualified operators often requires a considerable variety of information which must be taken into consideration at the moment in which these operators are working, for example, on a machine or industrial process. The known systems for assisting these operators envisage a remote control station, managed by a second operator and/or by a central computer, in communication with the first operator by means of the use of video cameras and microphones. The first operator may also be equipped with a portable computer connected to the central station.

However, these known systems are difficult to use and are not very flexible, particularly in those cases in which the assisted operator needs to continuously keep various operating parameters under control while he is engaged in an operating stage, or in cases in which there is limited space for movement.

SUMMARY OF THE INVENTION

The objective of this invention is to realize a system for assisting an operator during a work stage which allows the operator to monitor the parameters of the work stage easily without distracting himself excessively from the operations he is engaged in.

This objective is achieved according to the invention by a system for assisting an operator with the characteristics defined in the claims.

BRIEF DESCRIPTION OF THE DRAWINGS

Several forms of preferred but non-limitative embodiment of the invention will now be described, making reference to the attached drawings, in which:

FIG. 4 is a representation which illustrates an example of the use of an interface device of the system according to this invention; and FIG. 5 is a representation of a base plan which illustrates a configuration of the interface device illustrated in FIG. 4.

DETAILED DESCRIPTION OF THE INVENTION

Figure 1:
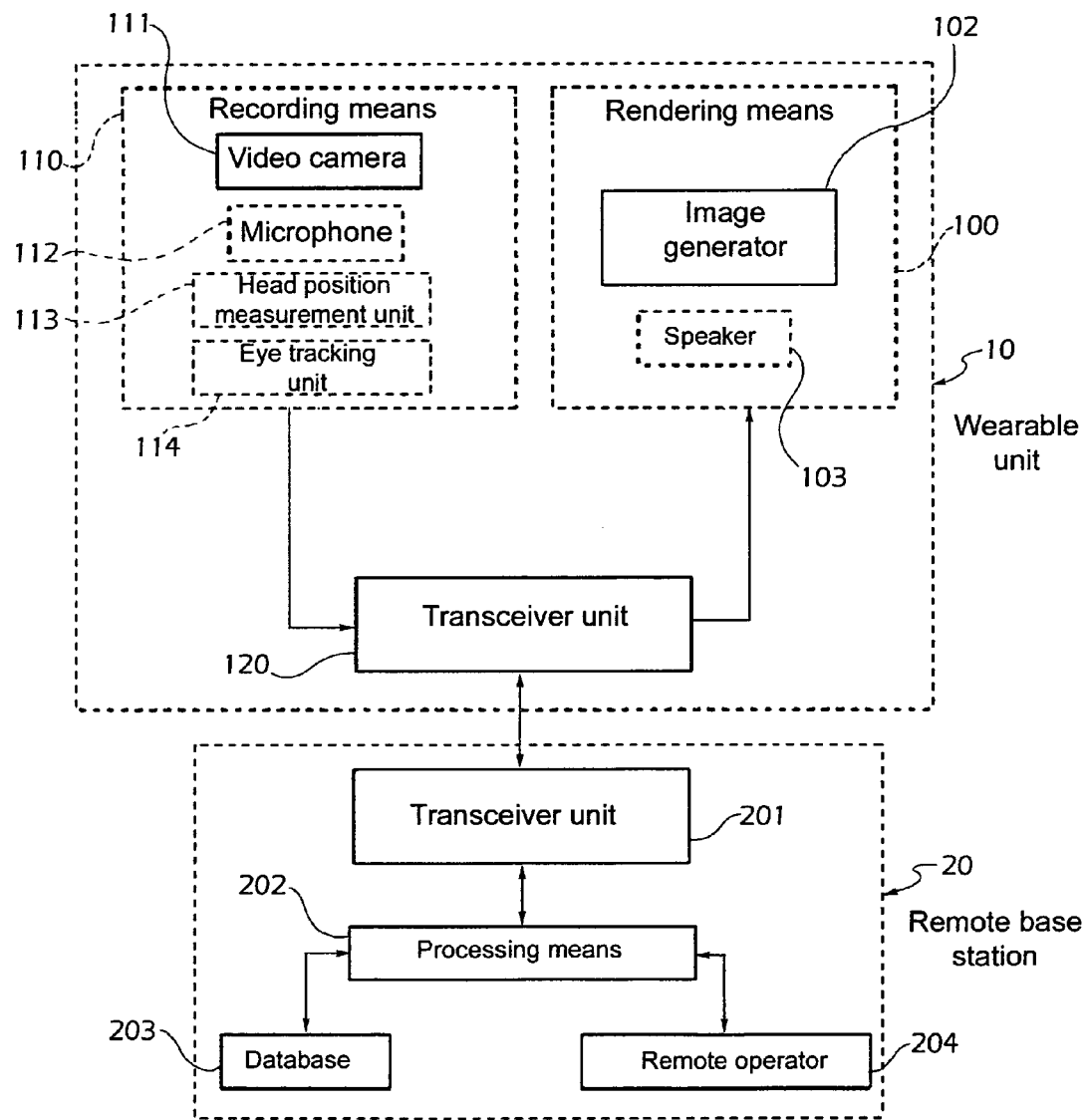
FIG. 1 is a block diagram which illustrates a first embodiment of a system for assisting an operator in a work stage according to this invention.

With reference to FIG. 1, a system for assisting an operator during a work stage essentially comprises an interface unit 10 capable of being worn by the operator (not illustrated), and a remote base station 20, to which said interface unit 10 is connected.

The interface unit 10 comprises a support structure 11, suitable for being worn by the operator, mounted on which is at least one transparent screen element 12 suitable for being placed in front of at least one of the operator's eyes (see FIGS. 4 and 5). Preferably, the support structure 11 is formed by a spectacles frame, with the transparent screen element 12 formed by the lenses of these spectacles. Reference will always be made hereinafter to this form of preferred embodiment. Nevertheless, the support structure 11 and the transparent screen element 12 can have another form, for example that of a helmet with respective visor.

The wearable interface unit 10 comprises means 100 for rendering a signal coming from the remote base station 20 arranged on the support structure 11. These rendering means 100 comprise a virtual image generator 102 suitable for providing the operator, through the transparent screen 12, with a virtual image superimposed on the background observed by the operator and fluctuating at a predetermined distance from the eye. This distance is preferably close to the working distance, namely the distance between the operator's eyes and the real object he is working on. This makes it possible to minimise the focal accommodation effort when the operator's attention is shifted from the virtual image to the real object and vice versa. For this purpose, the virtual image generator 102 comprises miniaturized means of image generation, for example a microdisplay with liquid crystals (or LCD), cathode ray tube (or CRT), or organic (or OLED) or inorganic light emitters, suitable for generating a synthetic image, an optical image formation system, suitable for forming a virtual image of said synthetic image, and a system for conveying the image (a light guide for example) suitable for transferring said virtual image towards the operator's visual field. Moreover the rendering means 100 preferably comprise a speaker 103, suitable for making a sound signal available to the operator.

The wearable interface unit 10 also comprises recording means 110 again arranged on the support structure 11, suitable for recording a physical signal coming from the operator and/or from the working environment and for making available a corresponding electrical signal representative of this physical signal. The recording means 110 comprise a video camera 111, suitable for recording a visual field of the background perceived by the operator through the transparent element 12, and, preferably, a microphone 112, a head position measurement unit 113, of the inertial type for example, and/or an eye position tracking unit 114.

The visual field caught by the video camera 111 and the visual field subtended by the virtual image produced by the virtual image generator 102 can be coincident; in the case in which the former is smaller than the latter, the operator can recognise the visual field caught by the video camera 111 by means of the generation of an appropriately dimensioned frame inside the visual field subtended by the virtual image, said frame enclosing the visual field caught by the video camera.

Finally, the wearable interface unit 10 comprises a transmission/reception unit 120, fitted on the support structure 11, and suitable for transmitting the electrical signal generated by the recording means 110 to the remote base station 20 and for receiving the signal coming from the remote base station 20 and sending it to the rendering means 100.

The remote base station 20 comprises a transmission/reception unit 201 operatively connected to the transmission/reception unit 120 of the wearable interface unit 10, and processing means 202 connected to the transmission/reception unit 201 of the base station 20 to process the signals coming from the wearable interface unit 10. These signals comprise a video signal from the video camera 111, representative of the visual field perceived by the operator, an audio signal from the microphone 112, a signal containing the coordinates of the position/orientation of the operator's head coming from the measuring unit 113, and/or a signal containing the coordinates of the position of the pupil of the operator's eye coming from the tracking unit 114. A monitor (not shown) connected to the processing means 202 is able to display the image caught by the video camera 111 on the basis of the video signal coming from the video camera. A database 203 resident in a memory device of the processing means 202 collects a plurality of data of use to the operator for carrying out the required operations. On the basis of the signals (video, audio, head position/orientation and/or position of the pupil of the eye) coming from the wearable interface unit 10 the processing means 202 generate information capable of being compared with the data of the database 203. This information can in turn be stored in the database 203. A second operator 204 of the remote station 20 is able to control and/or modify the information generated by the processing means 202 by means of known devices, such as mouse, keyboard, joystick, optical pen and the like. This operator 204, following comparison of the information with the data of the database 203 and/or other sources of information of conventional types (for example, technical leaflets, manuals and so on), generates the final audiovisual information which is transmitted by means of transmission/reception units 201, 120, to the virtual image generator 102, which provides for the rendering of this virtual image to the first operator, superimposed on the background observed by him, and/or to the speakers 103. The processing means 202 are also preferably provided with a microphone and a speaker (not illustrated) which also allow the second operator 204 to communicate vocally with the first operator.

The display of instructions and information superimposed on the real image can take place in a manner integral with the first operator's head, or in an integral manner with the surrounding environment, on the basis of the head position/orientation signal provided by the measuring unit 113 and processed by the processing means 202, or even integrally with the observer's gaze, on the basis of the position signal of the pupil of the eye supplied by the tracking unit 114 and processed by the processing means 202. All the display modes are available in a known manner both automatically and manually, following a command from the first or second operator.

In particular, the second operator can decide to couple all or part of the information to a particular of the scene caught by the video camera 111, in such a way that the first operator will see this information linked with the background in a fixed position and independent from the rotation of the head. In this mode, a rotation of the first observer's head will make the information move inside the visual field, produced by the virtual image generator 102, in the direction opposite to the movement of the head; if the rotation of the head makes the information leave the visual field produced by the virtual image generator 102, the information will no longer be visible to the operator until the latter moves his head back to a position close to the original one. This mode will preferably be used to render information geometrically correlated with the object the operator is working on.

Alternatively, the image can be presented to the first operator in a manner integral with the position/orientation of the head; in this case, the video information will occupy a fixed region of the visual field, produced by the virtual image generator 102, and will therefore follow the movements of the operator's head. This mode will generally be used for information not spatially correlated with the object on which the first operator is working.

The third image rendering mode, integral with the direction of the gaze, can be used for drawing the operator's attention to information critical for safety.

The measuring unit 113 can be an inertial measuring unit, which measures the coordinates of the head with respect to the earth reference system or, alternatively, a system (not illustrated) for the recognition of predetermined particulars present in the operator's visual field and caught by the video camera 111, so that the alignment of the displayed instructions/information with the surrounding environment takes place by alignment of these instructions/information with the above-mentioned particulars of the visual field.

According to a variant of this embodiment, particularly suitable in those cases in which the operations to assist are of a simple and mechanical type, the second operator 204 is absent, and the processing means 202 are programmed so as to be capable of assisting the first operator on their own, automatically generating the audiovisual information to transmit to the first operator through the transmission/reception units 201 and 120.

The eye-position tracking unit 114 can be used by the first operator in an active manner, for example for navigating through menus without having to take his hands off the object he is working on (hands-free operation), or to report details of the visual field of particular interest caught by the video camera 111 to the processing means 202, for example to select background details on which he wants the information to be coupled. The first operator can check the selections made through the movement of the eye thanks to a virtual pointer present in the virtual image generated by the generator 102.

Figure 2:
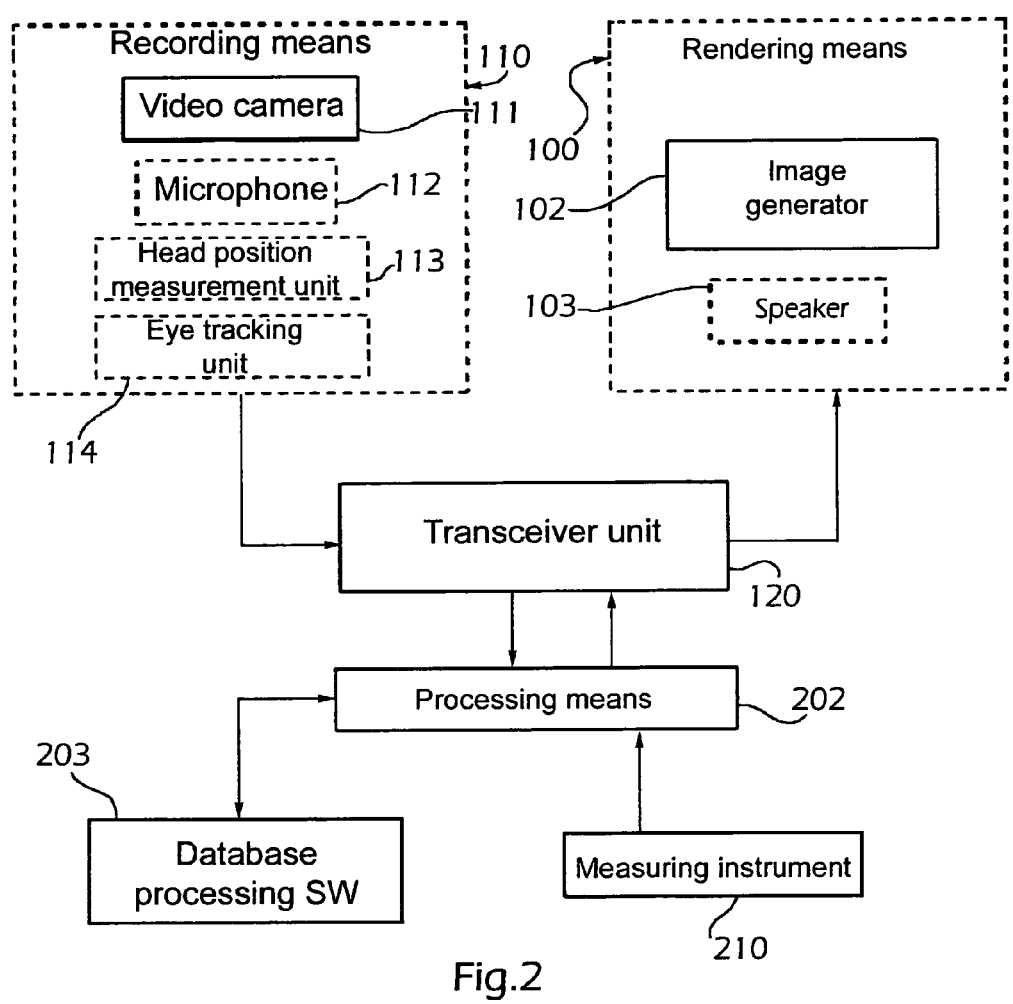
FIG. 2 is a block diagram which illustrates a second embodiment of a system for assisting an operator in a work stage according to this invention.

FIG. 2 shows a second embodiment of the system for assisting an operator during a work stage. The components identical to those in the previous embodiment have been indicated using the same reference numbers, and will not be described further. This second embodiment is substantially identical to the variant of the first embodiment without the second operator, the difference consisting of the fact that all the components are integrated in the wearable interface unit 10, all arranged on the support structure 11. In this case, the transmission/reception unit 120 will consist of a simple wire. Preferably, there are also measuring instruments 210 connected to said processing means 202 and not necessarily positioned on the wearable unit 10, to permit the operator to make any measurements requested by the working stage and to obtain information drawn up on the basis of these measurements.

According to a variant of this embodiment, the components which were contained in the base station 20 in the first form of embodiment are now integrated in a second wearable unit (not illustrated) separate from the first unit 10. In this case, the transmission/reception units 120 and 201 can consist of a simple wire, or of respective wireless transceiver modules.

Figure 3:
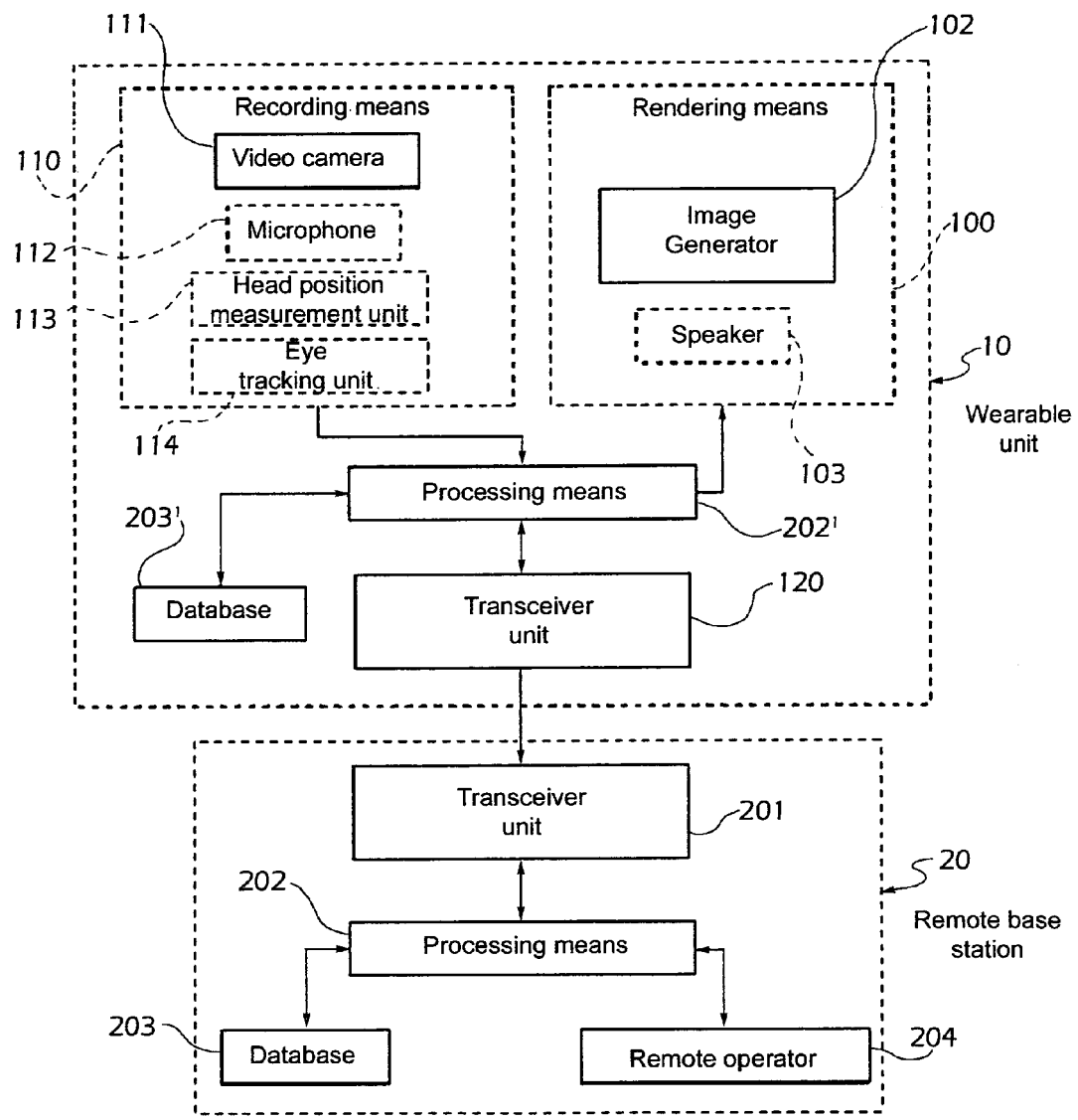
FIG. 3 is a block diagram which illustrates a third embodiment of a system for assisting an operator in a work stage according to this invention.

FIG. 3 illustrates a third embodiment of the system for assisting an operator during a work stage. The components identical to those in the previous embodiment have been indicated using the same reference numbers, and will not be described further. This third embodiment is substantially identical to the variant of the first embodiment without the second operator, the difference consisting of the fact that the wearable interface unit 10 comprises processing means 202' and database 203' additional to those in the base station 20.

With this embodiment, the interface unit 10 is capable of working autonomously with respect to the base station 20, the transfer of data being possibly limited to loading or updating the database of the base station 20.

FIG. 4 shows an example of an application of the wearable interface unit 10 in maintenance and/or repair operations on a motor vehicle engine. In this example, the unit 10 is used for providing the operator both with information not geometrically correlated with the observed object (in this example, the current time and general information on the mechanics of the engine) and instructions spatially correlated with the object (in this example, an indication of possible oil leakage).

It goes without saying, without affecting the principle of the invention, that the embodiment details and the forms of implementation may be varied widely with respect to what has been described and illustrated, without leaving the scope of the invention by so doing.

What is claimed is:

1. Interface system for assisting an operator during a work stage, comprising:
    a support structure wearable by the operator, on which is arranged at least one transparent screen element suitable for being placed in front of at least one of the operator's eyes to permit the operator to see at least one portion of the background;
    virtual image generating means suitable for producing an optical signal directed towards the operator's retina in such a way as to form a virtual image at a predetermined distance from the operator's eyes and superimposed on said background;
    recording means integral with the operator's head, suitable for recording at least part of the operator's visual field and making available a signal representative of said visual field;
    processing means suitable for processing said signal from the recording means and generating a visual information signal of use to the operator for carrying out said work stage; and
    means of reception/transmission suitable for sending said signal from the recording means to said processing means and as a consequence rendering said information signal to said virtual image generating means, in such a way as to provide the operator with visual information relating to said work stage superimposed on said visual field of the operator.

2. System according to claim 1, in which said processing means are arranged in a remote control station.

3. System according to claim 2, in which said processing means are controlled by a second operator.

4. System according to claim 3, in which said system comprises means for recording and means for rendering an audio signal, said means being integrated on one side in said support structure, and arranged on the other in said control station in order to put said first and second operators into audio communication.

5. System according to claim 1, in which said processing means are at least integrated in part in said support structure.

6. System according to claim 5, in which said processing means are integrated in part in said support structure and in part in a second unit wearable by the operator.

7. System according to claim 1, in which said visual information signal is generated by the processing means on the basis of the information recorded by recording means integral with the operator's head, comparing this information with data present in a database.

8. System according to claim 7 in which said database is integrated at least in part in the support structure.

9. System according to claim 7 in which said database is integrated at least in part in a remote base station.

10. System according to claim 7 in which said database is integrated at least in part in a second wearable unit different from the support structure.

11. System according to claim 1, in which said visual information signal is generated by the processing means on the basis of the information recorded by recording means integral with the operator's head and additional measuring instruments operatively connected to said processing means.

12. System according to claim 1, in which at least part of the virtual image associated with said information signal is made available to the operator in a manner integral with the operator's head.

13. System according to claim 1, also comprising a measuring unit, preferably inertial, of the position and/or orientation of the operator's head, integrated in said support structure, in which at least part of the virtual image associated with said information signal is made available to the operator in a manner integral with the background observed by the operator, the alignment between the virtual image and the background being obtained from measurement of the coordinates of the operator's head, read by said measuring unit.

14. System according to claim 1, in which at least part of the virtual image associated with said information signal is made available to the operator in an manner integral with the surrounding environment, the alignment between the virtual image and the background being obtained through the recognition of particulars present in the operator's visual field caught by said recording means.

15. System according to claim 14, in which at least part of the virtual image associated with said visual information is coupled with a detail of the visual field caught by the recording means.

16. System according to claim 15, in which said particular of the visual field caught by the recording means is selected by a second operator positioned in a remote control station.

17. System according to claim 15, comprising means for tracking the position of the pupil of the eye, in which said particular of the visual field caught by the recording means is selected by the operator himself by fixing his gaze on said particular, the direction of the gaze being recorded by said tracking means.

18. System according to claim 1, comprising means for tracking the position of the pupil of the eye, in which at least part of the virtual image associated with said information signal is made available to the operator in a manner integral with his gaze, the direction of the gaze being recorded by said tracking means.

19. System according to claim 1, in which the rendering distance of said virtual image is close to the distance between the operator's eyes and the object on which the operator is carrying out the work.

* * * * *